INVENTOR.
HANS-PETER NEUBERT
BY
ATTORNEY.

Feb. 24, 1970     HANS-PETER NEUBERT     3,497,323
APPARATUS FOR MEASURING THE CONCENTRATION
OF COMBUSTIBLE GASES AND VAPORS
Filed Feb. 18, 1966     2 Sheets-Sheet 2

INVENTOR.
HANS-PETER NEUBERT
BY
Ronald H Shakely
ATTORNEY.

3,497,323
APPARATUS FOR MEASURING THE CONCENTRATION OF COMBUSTIBLE GASES AND VAPORS
Hans-Peter Neubert, Berlin, Germany, assignor to Auergesellschaft G.m.b.H., Berlin, Germany, a corporation of Germany
Filed Feb. 18, 1966, Ser. No. 528,469
Claims priority, application Germany, Feb. 19, 1965, 1,281,722
Int. Cl. G01n 31/00
U.S. Cl. 23—254
6 Claims

ABSTRACT OF THE DISCLOSURE

Apparatus for the measurement of the concentration of combustible gases, such as methane, in which the gas mixture is catalytically burned, and more particularly to such an apparatus that does not give a false indication at high combustible gas concentration, comprising a detector filament and a substantially identical compensator filament each adapted to be brought into contact simultaneously with a sample of a gas mixture to be tested, the detector filament alone being adapted to cause oxidation of combustible constituents therein, a Wheatstone bridge circuit including in one branch the detector and compensating filaments and in the other branch fixed resistances and an indicator instrument that indicates bridge unbalance, a source of electrical power connected to the bridge circuit, a second circuit connecting one pole of said power source to one pole of said indicator instrument through a normally open switching means, a thermal conductivity filament exposed to said air-gas mixture and operatively associated to close said switching means when the combustible gas concentration exceeds a predetermined amount.

---

This invention relates to an apparatus for the measurement of the concentration of combustible gases, such as methane, in which the gas mixture is catalytically burned, and more particularly to such an apparatus that does not give a false indication at high combustible gas concentration.

Figure 1:
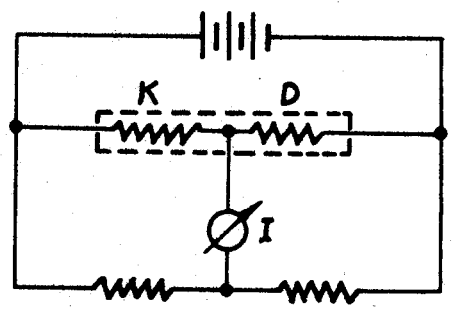
Figure 2:
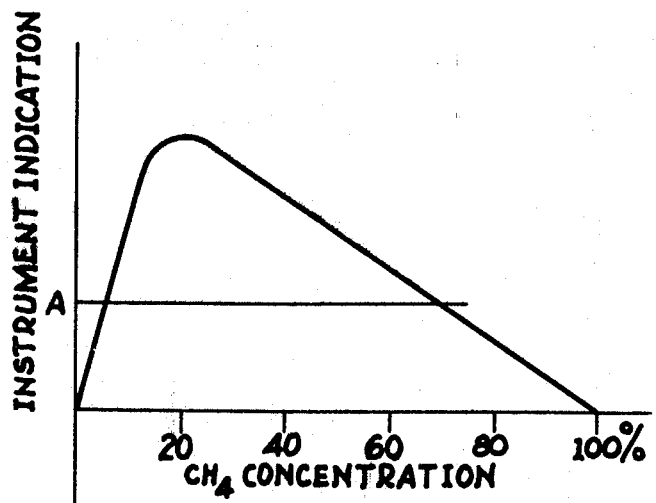
Figure 3:
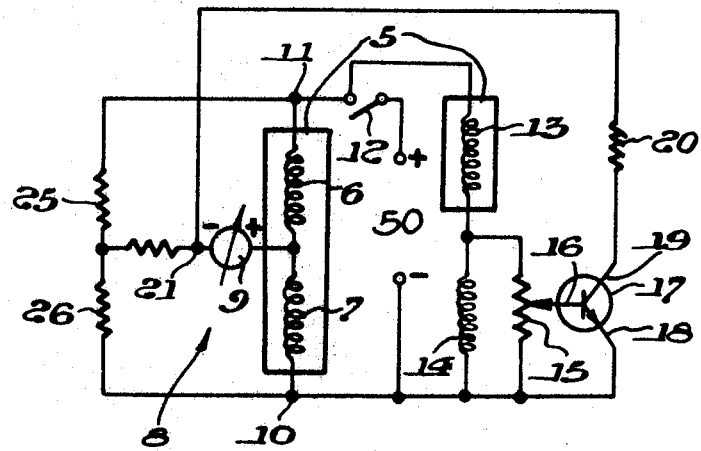
Figure 4:
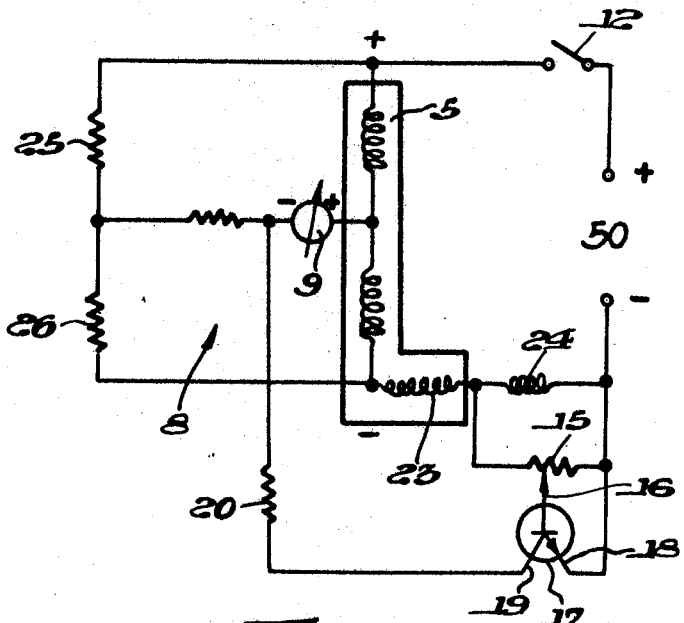

In the accompanying drawings,
FIG. 1 is a schematic circuit diagram of a conventional apparatus;
FIG. 2 is a graph showing the instrument indication of the apparatus of FIG. 1 at various methane concentrations;
FIG. 3 is a schematic circuit diagram of a preferred embodiment of this invention; and
FIG. 4 is a schematic circuit diagram of another preferred embodiment of this invention.

The measurement principle employed in the past, in the so-called "hot-wire" instruments of which this invention is a variation, consisted of a measuring chamber into which the air-gas mixture to be tested is conducted. Referring to FIG. 1, a detector filament D and a compensating filament K, generally in the form of a coiled wire, are located in the chamber and exposed to the gas being analyzed and are adjacent bridge resistances of a Wheatstone bridge circuit. The filaments are electrically preheated and as the gas mixture is drawn into the chamber it is catalytically burned on the detector filament, which is made of a catalytically active material such as palladium-coated platinum, thereby increasing the detector filament temperature and resistance. The compensating filament is electrically equivalent to the detector filament but is not catalytically active, such as for example platinum coated with sodium hydroxide. The difference in resistance caused by the selective combustion on the detector filament causes a bridge unbalance that is reflected by an indicator instrument I, calibrated to show percent combustible.

A disadvantage of the above principle of measurement lies in the fact that to properly effect complete catalytic combustion on the detector coil there must be sufficient oxygen in the combustible gas mixture to support combustion on the detector filament. Therefore, when the concentration of the combustible gas in the air-gas mixture is so high that there is insufficient oxygen for complete combustion, an ambiguous indication is given, as is indicated in FIG. 2. For example, referring to point A on FIG. 2, such an instrument will give an identical indication for air-methane mixtures containing either 5% or 70% methane.

It is an object of this invention to provide an apparatus of the hot-wire type for determining the concentration of combustible gases in air that does not give a false low indication of combustible gas concentration in oxygen deficient atmospheres. Another object is to provide such an apparatus in which the indicator will show a full scale deflection at any concentration of combustible gas in excess of the indicator instrument range.

In the apparatus of this invention, the objectives are obtained by adding to a conventional Wheatstone bridge hot-wire apparatus, a circuit connecting one pole of the power source to one pole of the indicating instrument to apply sufficient potential to cause full scale deflection of the indicating instrument in an oxygen deficient atmosphere. This circuit contains a normally open switch that closes in response to the change of electrical resistance of a thermal conductivity filament, that is, a heated filament that is not catalytically active, exposed to the gas sample. The resistance of the thermal conductivity filament changes with increasing combustible gas concentration, for example, it decreases with increasing methane concentration, because of the differing thermal conductivity of the combustible gas and air.

In the preferred embodiment of this invention, a switch-transistor is used to close the circuit applying potential from the power source to the indicator instrument, and this circuit contains a resistance sized to provide the desired potential to the indicator instrument. The circuit activating the switch-transistor, which includes the thermal conductivity filament, preferably contains a second filament electrically equivalent and connected in series with the thermal conductivity filament, which second filament is in a sealed gas filled chamber. The thermal conductivity filament and second filament serve in a potentiometer circuit as a control for the switch-transistor. Preferably there is a potentiometer connected in parallel to said second filament, the movable contact of said potentiometer being connected to the base of said switch-transistor.

Referring to FIG. 3, the gas mixture to be measured is passed through the measuring chamber 5. In the measuring chamber are located a compensating filament 6 and a detector filament 7 of a Wheatstone bridge 8, including fixed resistances 25 and 26 and indicating instrument 9. The two points 10 and 11 are connected to a current source 50 by way of an on-off switch 12. Parallel with the Wheatstone bridge 8 are connected the thermal conductivity filament 13 and the second filament 14, the thermal conductivity filament 13 being exposed to the gas sample and the second filament 14 being located in a sealed chamber filled with air. The filament 14 is bridged by a potentiometer 15, whose movable contact is connected to the base 16 of a switch-transistor 17 (for example, an NPN transistor). The emitter 18 of the switch-transistor 17 is connected to the negative pole of the current source 50 and the collector 19 of the switch-transistor 17 is connected through a resistance 20 to the negative pole 21 of the indicator instrument 9.

The apparatus is turned on by closing switch 12. If the concentration of methane in an air-methane mixture in the measuring chamber 5 is zero, the indicator instrument 9 will read zero. At increasing concentrations of methane, the Wheatstone bridge 8 is unbalanced due to change in resistance of the detector filament 7, and the indicating instrument 9 would be deflected to indicate the methane concentration. At the same time the resistance value of the thermal conductivity filament 13 is decreased due to methane being a better heat conductor than air, its resistance decreasing with increasing methane concentration. As a result the base 16 of the switch-transistor 17 becomes more positive with increasing methane concentration, finally becoming sufficiently positive to allow the switch-transistor 17 to pass current. The negative pole of the current source 50 is then connected, through the switch-transistor 17 and resistance 20, to the negative pole 21 of the indicator instrument 9 so that indicator instrument 9 is fully deflected. The circuit must be adjusted so that at a 100% methane content in the air-methane mixture the indicator instrument 9 shows complete deflection.

The opening of the switch-transistor 17 need not be at any specific concentration but can occur within the range in which the concentration curve, as in FIG. 2, is above the indicator range.

In FIG. 4 the circuitry varies from that in FIG. 3 in that the thermal conductivity filament 23 and the second filament 24, corresponding to the thermal conductivity filament 13 and the filament 14 of FIG. 3, are in series rather than in parallel with the Wheatstone bridge 8. The advantage of the circuitry in FIG. 4 is that its output absorption is approximately 30% of the circuitry shown in FIG. 3.

If there is no constant bridge potential available for the invention circuitry then a stabilization of the switch-transistor contact points can be acomplished by familiar electronic means. Beyond that an arrangement of several switch-transistor stages yields an especially high switching precision.

According to the provisions of the patent statutes, I have explained the principle and mode of practice of my invention and have described what I now consider to represent its best embodiment. However, I desire to have it understood that, within the scope of the appended claims, the invention may be practiced otherwise than as specifically described.

I claim:

1. Combustible gas testing apparatus comprising a detector filament and a substantially identical compensator filament each adapted to be brought into contact simultaneously with a sample of a gas mixture to be tested, the detector filament alone being adapted to cause oxidation of combustible constituents therein, a Wheatstone bridge circuit including in one branch the detector and compensating filaments and in the other branch fixed resistances and an indicator instrument that indicates bridge unbalance, a source of electrical power connected to the bridge circuit, a second circuit connecting one pole of said power source to one pole of said indicator instrument through a normally open switching means, a thermal conductivity filament exposed to said air-gas mixture and operatively associated to close said switching means when the combustible gas concentration exceeds a predetermined amount.

2. An apparatus according to claim 1 in which said switching means is a transistor and said second circuit contairs a series connected fixed resistance, said transistor becoming operative to pass current in response to change of resistance of said thermal conductivity filament.

3. An apparatus according to claim 2 in which said thermal conductivity filament is connected in a circuit across said power source, said circuit having a second resistance in series with said thermal conductivity filament, said second resistance being a filament contained in a sealed air-filled chamber.

4. An apparatus according to claim 3 in which a potentiometer is connected in parallel to said second resistance and the movable contact of said potentiometer is connected to the base of said transistor.

5. An apparatus according to claim 4 in which said thermal conductivity filament circuit is connected in parallel with said Wheatstone bridge.

6. An apparatus according to claim 5 in which said thermal conductivity filament circuit is connected in series with said Wheatstone bridge.

References Cited

UNITED STATES PATENTS

| | | |
|---|---|---|
| 2,617,716 | 11/1952 | Hartline. |
| 2,687,342 | 8/1954 | Strange et al. |
| 2,698,223 | 12/1954 | Richardson. |
| 2,762,568 | 9/1956 | Sullivan. |
| 2,879,142 | 3/1959 | Jones et al. |
| 2,888,330 | 5/1959 | Kapff. |
| 2,901,329 | 8/1959 | Kapff. |
| 3,237,181 | 2/1966 | Palmer. |
| 3,239,828 | 3/1966 | Peterman. |
| 3,311,455 | 3/1967 | Robinson. |

MORRIS O. WOLK, Primary Examiner

R. E. SERWIN, Assistant Examiner

U.S. Cl. X.R.

23—255; 73—27